United States Patent
Ikegami et al.

(10) Patent No.: US 11,048,024 B2
(45) Date of Patent: Jun. 29, 2021

(54) LIGHT-SHIELDING PLATE

(71) Applicant: NIPPON ELECTRIC GLASS CO., LTD., Otsu (JP)

(72) Inventors: Koji Ikegami, Otsu (JP); Yusuke Yamazaki, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 119 days.

(21) Appl. No.: 16/088,846

(22) PCT Filed: Apr. 3, 2017

(86) PCT No.: PCT/JP2017/013939
§ 371 (c)(1),
(2) Date: Sep. 27, 2018

(87) PCT Pub. No.: WO2017/183432
PCT Pub. Date: Oct. 26, 2017

(65) Prior Publication Data
US 2019/0107649 A1   Apr. 11, 2019

(30) Foreign Application Priority Data
Apr. 18, 2016 (JP) .............................. JP2016-082597

(51) Int. Cl.
*G02B 5/20* (2006.01)
*G02B 1/115* (2015.01)
(Continued)

(52) U.S. Cl.
CPC ................ *G02B 1/115* (2013.01); *G02B 1/10* (2013.01); *G02B 1/18* (2015.01); *G02B 5/003* (2013.01); *G02B 5/021* (2013.01); *G02B 5/22* (2013.01)

(58) Field of Classification Search
CPC . G02B 1/10; G02B 1/105; G02B 1/11; G02B 1/115; G02B 1/18; G02B 5/003;
(Continued)

(56) References Cited

U.S. PATENT DOCUMENTS

| 6,344,288 B1 | 2/2002 | Oyama et al. |
| 2014/0283904 A1* | 9/2014 | Huang .............. H01L 31/02168 |
| | | 136/256 |

(Continued)

FOREIGN PATENT DOCUMENTS

| EP | 1 110 920 A1 | 6/2001 |
| EP | 2 987 633 A1 | 2/2016 |

(Continued)

OTHER PUBLICATIONS

Official Communication issued in International Patent Application No. PCT/JP2017/013939, dated Jun. 27, 2017.

(Continued)

*Primary Examiner* — Thong Q Nguyen
(74) *Attorney, Agent, or Firm* — Keating and Bennett, LLP

(57) ABSTRACT

A light shielding plate includes an infrared transmitting region next to a visible/infrared opaque region. The light shielding plate includes a glass plate including first and second principal surfaces; a visible/infrared opaque film on or over the second principal surface; an infrared transmitting film on or over the first principal surface or the second principal surface; and a light absorption film on or over the first principal surface or the second principal surface. The light shielding plate includes a visible/infrared opaque region including the visible/infrared opaque film; and an infrared transmitting region that transmits infrared light next to the visible/infrared opaque region, the light absorption film is in the visible/infrared opaque region and the infrared (Continued)

transmitting region, and the infrared transmitting film is at least in the infrared transmitting region.

12 Claims, 4 Drawing Sheets

(51) Int. Cl.
G02B 1/18 (2015.01)
G02B 5/22 (2006.01)
G02B 1/10 (2015.01)
G02B 5/00 (2006.01)
G02B 5/02 (2006.01)

(58) Field of Classification Search
CPC . G02B 5/20; G02B 5/208; G02B 5/22; G02B 27/00; G02B 27/0018
USPC ............ 359/350, 358–361, 586–590
See application file for complete search history.

(56) References Cited

U.S. PATENT DOCUMENTS

2015/0226882 A1* 8/2015 Sahara ................. B24C 1/06
359/601
2017/0023705 A1 1/2017 Sahara et al.
2019/0258107 A1* 8/2019 Fuju ................. H01L 21/0276
2019/0285934 A1* 9/2019 Fuju ................. G02F 1/1335

FOREIGN PATENT DOCUMENTS

| | | |
|---|---|---|
| JP | 2005-043749 A | 2/2005 |
| JP | 2012-150418 A | 8/2012 |
| JP | 2013-182358 A | 9/2013 |
| JP | 2014-52775 A | 3/2014 |
| JP | 2014-99159 A | 5/2014 |
| JP | 2014-137497 A | 7/2014 |
| JP | 2015-41021 A | 3/2015 |
| JP | 2017-90637 A | 5/2017 |
| KR | 10-0563419 B1 | 3/2006 |
| WO | 93/04993 A1 | 3/1993 |
| WO | 99/44080 A1 | 9/1999 |
| WO | 2005/059602 A1 | 6/2005 |
| WO | 2013/094476 A1 | 6/2013 |
| WO | 2014/034720 A1 | 3/2014 |
| WO | 2015/049795 A1 | 4/2015 |

OTHER PUBLICATIONS

Official Communication issued in corresponding European Patent Application No. 17785774.5, dated Jul. 8, 2020.

* cited by examiner

[FIG. 1.]
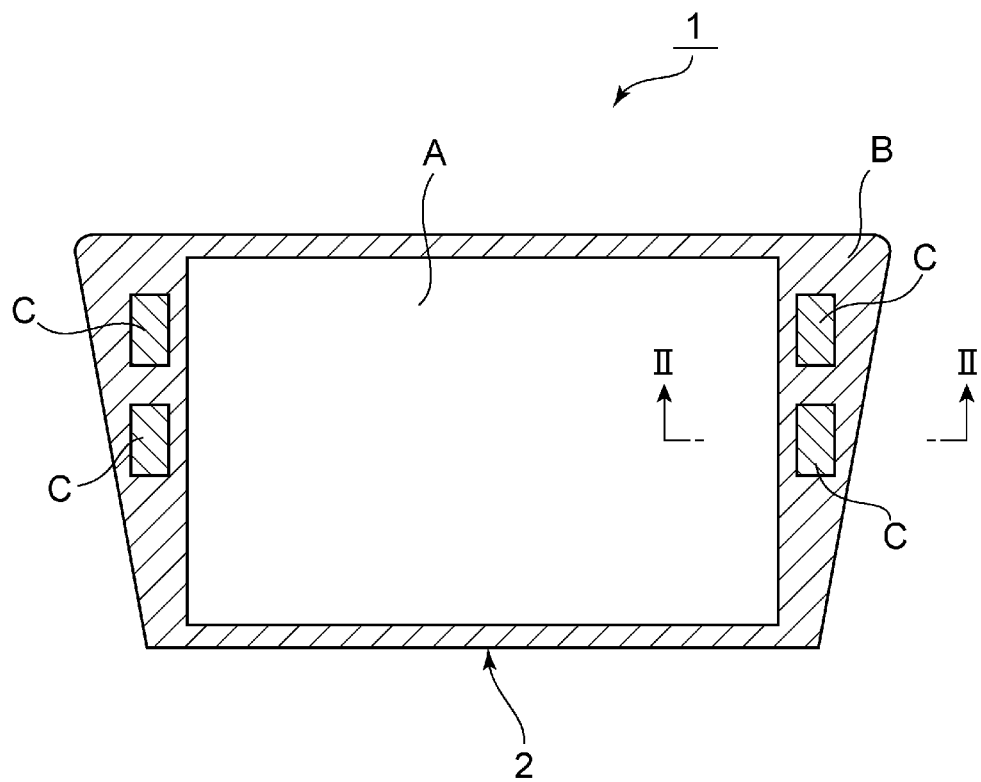
[FIG. 2.]
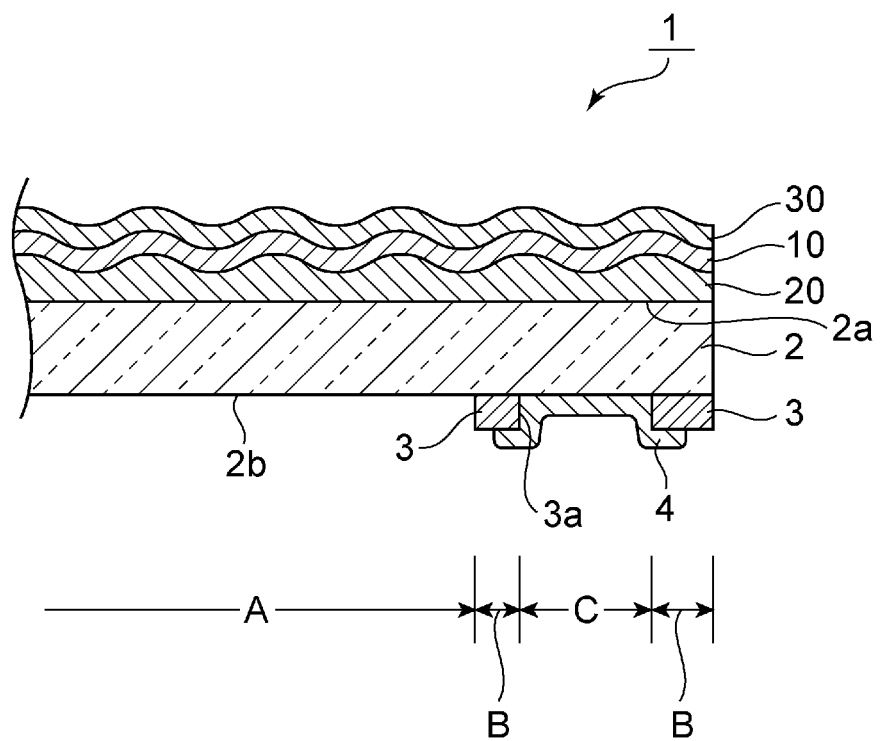

[FIG. 3.]
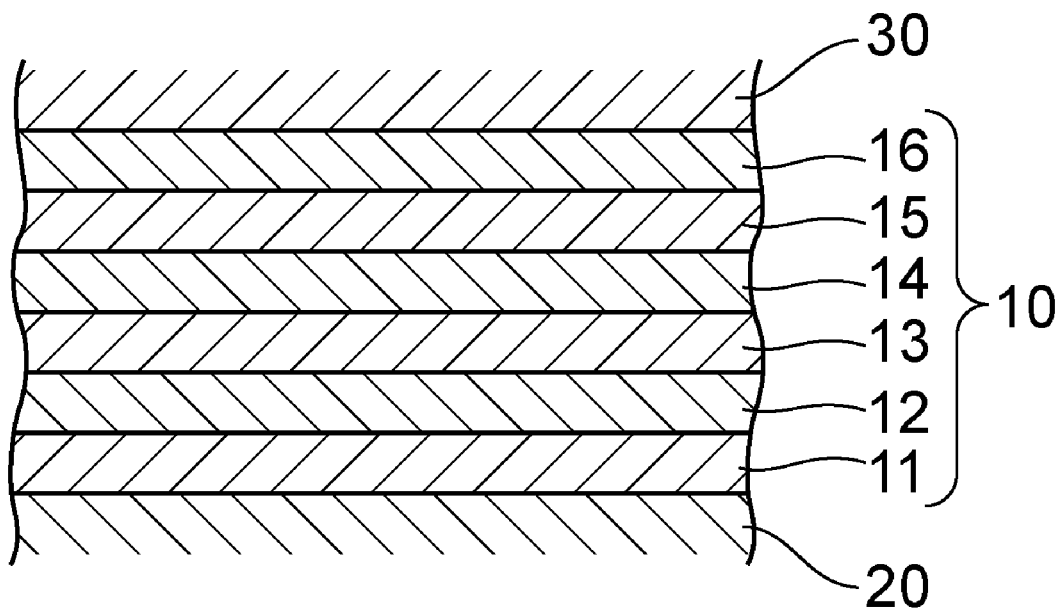
[FIG. 4.]
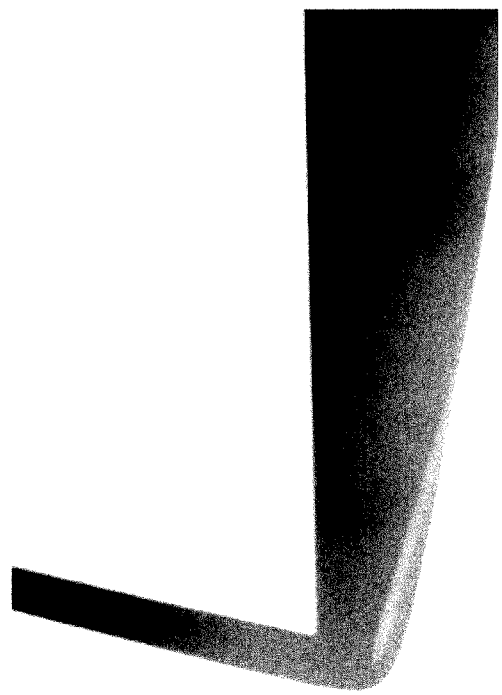

[FIG. 5.]
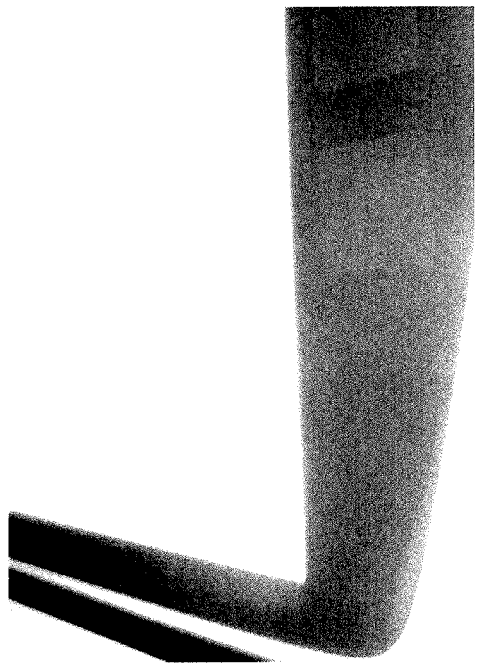
[FIG. 6.]
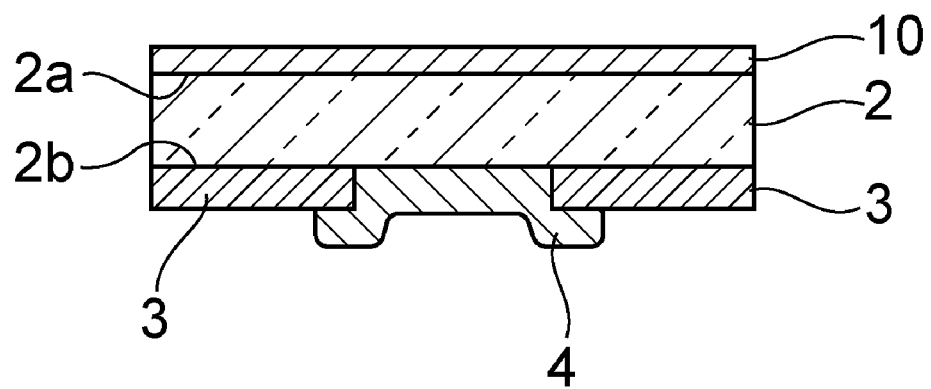
[FIG. 7.]
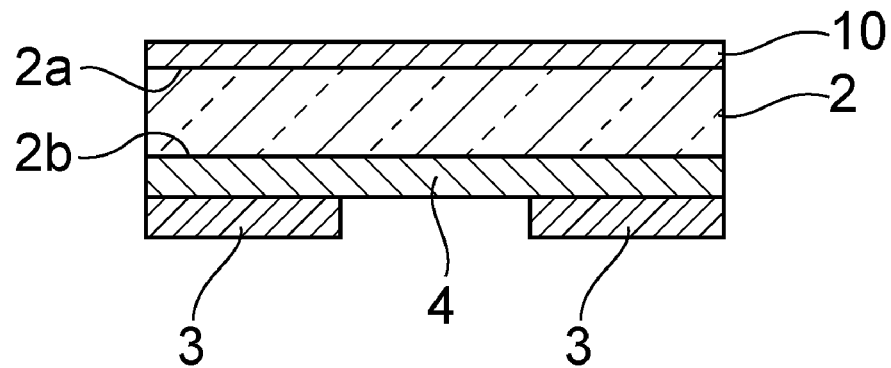

[FIG. 8.]
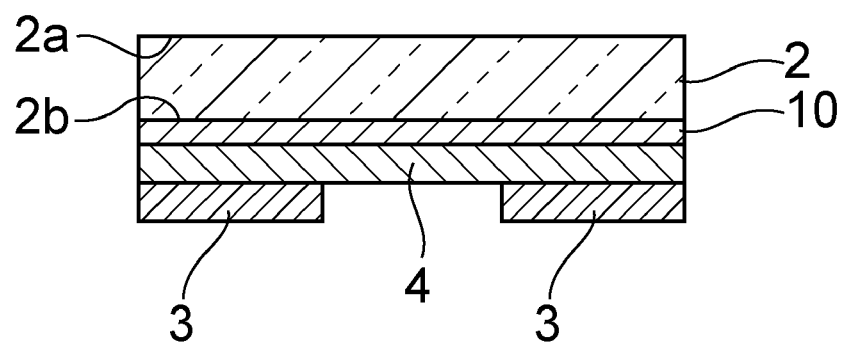
[FIG. 9.]
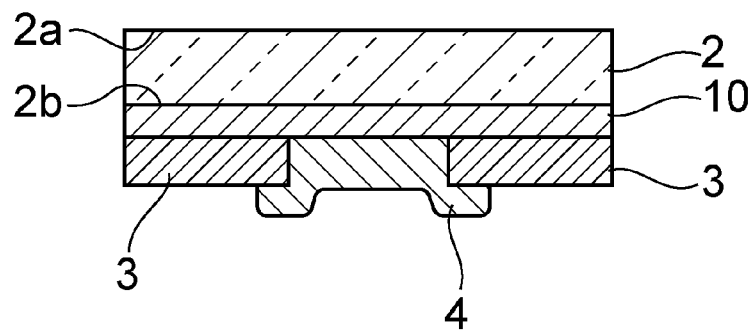

LIGHT-SHIELDING PLATE

TECHNICAL FIELD

The present invention relates to light shielding plates that can be used for displays and the like in which detection by infrared light is needed.

BACKGROUND ART

Recently, touch panels are being used in displays for mobile devices. In such a touch panel, in order to hide interconnection and so on present in its peripheral portion, a casing part made of a high light-shielding material is formed (see, for example, Patent Literature 1 (PTL 1)).

However, in the case of a vehicle-mounted display or the like, it is difficult and risky for a driver or an operator to touch a panel during driving or like operation. Therefore, there is demand for a method enabling operations of the panel without touching it. As one of such operating methods, a method is being considered for operating a panel by emitting infrared light from the panel and detecting an action, such as holding an operator's hand against the infrared light, with the infrared light.

In order to emit and detect infrared light, a window which transmits the infrared light is necessary. The provision of the window in such a casing part as described above is being considered for the purpose of making it less noticeable.

CITATION LIST

Patent Literature

[PTL 1]
JP-A-2014-99159

SUMMARY OF INVENTION

Technical Problem

However, the window, which is an infrared transmitting region provided next to a visible/infrared opaque region, looks red, resulting in the problem of lack of a high-class touch.

An object of the present invention is to provide a light shielding plate that, even if an infrared transmitting region is provided next to a visible/infrared opaque region, makes the infrared transmitting region less distinguishable with the naked eye.

Solution to Problem

The present invention is directed to a light shielding plate including: a glass plate having a first principal surface and a second principal surface opposed to the first principal surface; a visible/infrared opaque film provided on or over the second principal surface; an infrared transmitting film provided on or over the first principal surface or the second principal surface to suppress transmission of visible light; and a light absorption film provided on or over the first principal surface or the second principal surface, wherein the light shielding plate includes: a visible/infrared opaque region formed of the visible/infrared opaque film to shield visible light and infrared light; and an infrared transmitting region that transmits infrared light, the infrared transmitting region is located next to the visible/infrared opaque region, the light absorption film is provided in the visible/infrared opaque region and the infrared transmitting region, and the infrared transmitting film is provided at least in the infrared transmitting region.

In the present invention, the infrared transmitting film may be provided, on or over the second principal surface, in the infrared transmitting region and at least a portion of the visible/infrared opaque region next to the infrared transmitting region and may be provided in the visible/infrared opaque region to overlie the visible/infrared opaque film.

In the present invention, the infrared transmitting film may be provided, on or over the second principal surface, in the infrared transmitting region and at least a portion of the visible/infrared opaque region next to the infrared transmitting region and may be provided, in the visible/infrared opaque region, between the glass plate and the visible/infrared opaque film.

In the present invention, the light absorption film may be provided on the second principal surface and the infrared transmitting film may be provided, over the second principal surface, in the infrared transmitting region and at least a portion of the visible/infrared opaque region next to the infrared transmitting region and may be provided, in the visible/infrared opaque region, between the light absorption film and the visible/infrared opaque film.

In the present invention, the visible/infrared opaque region and the infrared transmitting region are preferably black as viewed from the first principal surface side.

In the present invention, the light shielding plate may further include a visible transmitting region that transmits visible light and the light absorption film may be also provided in the visible transmitting region.

In the present invention, the light absorption film may be provided on or over the first principal surface and may have an antireflection function.

In the present invention, a region provided with the light absorption film preferably has a reflectance of 1% or less at a wavelength of 550 nm.

In the present invention, the light absorption film preferably includes: a silicon nitride layer; and a layer of a nitride or an oxynitride of at least one metal selected from the group consisting of niobium, titanium, zirconium, yttrium, tungsten, aluminum, and hafnium. In this case, the light absorption film preferably includes a layer of a niobium nitride and a layer of a titanium nitride as the layers of nitrides. Furthermore, the silicon nitride layers and the layers of nitride are preferably alternately laid on top of one another in the light absorption film.

In the present invention, the light absorption film may be provided over the first principal surface and an anti-glare layer may be provided between the glass plate and the light absorption film.

In the present invention, the light absorption film may be provided on or over the first principal surface and an antifouling layer may be then provided on top of the light absorption film.

Advantageous Effects of Invention

According to the present invention, the infrared transmitting region can be made less distinguishable with the naked eye.

BRIEF DESCRIPTION OF DRAWINGS

FIG. 1 is a plan view showing a light shielding plate according to a first embodiment of the present invention.

FIG. 2 is a cross-sectional view taken along the line II-II shown in FIG. 1.

FIG. 3 is a cross-sectional view showing a light-absorptive antireflection film in the embodiment shown in FIG. 1.

FIG. 4 is a photograph showing a casing part of the light shielding plate according to the embodiment of the present invention.

FIG. 5 is a photograph showing a casing part of a comparative light shielding plate.

FIG. 6 is a cross-sectional view showing a visible/infrared opaque region and an infrared transmitting region in a first embodiment of the present invention.

FIG. 7 is a cross-sectional view showing a visible/infrared opaque region and an infrared transmitting region in a second embodiment of the present invention.

FIG. 8 is a cross-sectional view showing a visible/infrared opaque region and an infrared transmitting region in a third embodiment of the present invention.

FIG. 9 is a cross-sectional view showing a visible/infrared opaque region and an infrared transmitting region in a fourth embodiment of the present invention.

DESCRIPTION OF EMBODIMENTS

Hereinafter, a description will be given of preferred embodiments. However, the following embodiments are merely illustrative and the present invention is not limited by the following embodiments. Throughout the drawings, elements having substantially the same functions may be referred to by the same reference signs.

FIG. 1 is a plan view showing a light shielding plate according to a first embodiment of the present invention. The light shielding plate according to this embodiment can be used as a cover glass or a front plate for a display. As shown in FIG. 1, in the light shielding plate 1 according to this embodiment, a visible transmitting region A, a visible/infrared opaque region B, and infrared transmitting regions C are formed on a glass plate 2 having opposed two principal surfaces (i.e., a first principal surface 2a and a second principal surface 2b shown in FIG. 2). The visible/infrared opaque region B is formed on a peripheral portion of the glass plate 2 and forms a so-called casing part. The infrared transmitting regions C are formed within the visible/infrared opaque region B. In other words, the infrared transmitting regions C are formed next to the visible/infrared opaque region B.

Windows each formed of the infrared transmitting region C are provided in pairs, one pair in each of right and left frame portions of the casing part of the light shielding plate 1. For example, the pair of windows can be designed so that one window of the pair emits infrared light and the other window detects the infrared light.

In this embodiment, the visible/infrared opaque region B and the infrared transmitting regions C are colored in black. It is more preferred that the visible/infrared opaque region B and the infrared transmitting region C have smaller differences in lightness index and chromaticness index in the L*a*b colorimetric system (CIE 1976), because the infrared transmitting regions C can be made less distinguishable with the naked eye. For example, their difference in lightness index is preferably 0.2 or less and more preferably 0.1 or less. Their difference in chromaticness index is preferably 1 or less and more preferably 0.5 or less. The visible transmitting region A located in the center is a region for displaying an image on a display.

The visible transmitting region A transmits at least visible light, while the visible/infrared opaque region B has a lower visible transmittance than the visible transmitting region A. The infrared transmitting regions C have a lower visible transmittance than the visible transmitting region A and a higher infrared transmittance than the visible/infrared opaque region B.

In the visible/infrared opaque region B, the average transmittance of light in a wavelength range of 400 nm to 750 nm is preferably 3% or less and more preferably 1% or less. Furthermore, in the visible/infrared opaque region B, the average transmittance of light in a wavelength range of 850 nm to 1000 nm is preferably 10% or less and more preferably 1% or less.

In the infrared transmitting regions C, the average transmittance of light in a wavelength range of 400 nm to 750 nm is preferably 3% or less and more preferably 1% or less. The transmittance of light in a wavelength range of 400 nm to 750 nm in the infrared transmitting regions C is particularly preferably the same as that in the visible/infrared opaque region B. Furthermore, in the infrared transmitting regions C, the average transmittance of light in a wavelength range of 850 nm to 1000 nm is preferably 15% or more, more preferably 50% or more, and particularly preferably in a range of 75% to 90%.

FIG. 2 is a cross-sectional view taken along the line II-II shown in FIG. 1. As shown in FIG. 2, an anti-glare layer 20 having a concavo-convex configuration is provided on the first principal surface 2a of the glass plate 2. The anti-glare layer 20 is provided for the purpose of giving a so-called anti-glare effect of reducing the reflection of outside light. A light-absorptive antireflection film 10 is then provided on top of the anti-glare layer 20. An antifouling layer 30 is then provided on top of the light-absorptive antireflection film 10.

A visible/infrared opaque film 3 forming a visible/infrared opaque region B is formed on the second principal surface 2b of the glass plate 2 opposed to the first principal surface 2a thereof. Since, as described previously, the visible/infrared opaque region B is formed on the peripheral portion of the glass plate 2, the visible/infrared opaque film 3 is provided on the peripheral portion of the glass plate 2.

As shown in FIG. 2, a recess 3a is formed in a region of the visible/infrared opaque film 3 where each infrared transmitting region C is formed. An infrared transmitting film 4 is provided to fill in the recess 3a of the visible/infrared opaque film 3. The infrared transmitting region C is formed by the infrared transmitting film 4 located within the recess 3a of the visible/infrared opaque film 3. The visible transmitting region A is a region where the visible/infrared opaque film 3 and the infrared transmitting film 4 are not provided.

No particular limitation is placed on the type of the glass plate 2 so long as it can be used for a light shielding plate. The glass plate 2 can be made of, for example, alkali-free glass, soda-lime glass, borosilicate glass, aluminosilicate glass, chemically tempered glass or the like.

The visible/infrared opaque film 3 can be made from ink, paste or the like containing a carbon-based black pigment, such as carbon black, or an oxide-based black pigment. No particular limitation is placed on the binder for the ink, paste or the like and, for example, an ultraviolet curable resin or a resin for a resist material can be used. The visible/infrared opaque film 3 can be formed by photolithography, screen printing or other processes. The visible/infrared opaque film 3 preferably has an average light transmittance of 3% or less in a wavelength range of 400 nm to 750 nm and more preferably has an average light transmittance of 1% or less in the wavelength range. Furthermore, the visible/infrared opaque film 3 preferably has an average light transmittance of 10% or less in a wavelength range of 850 nm to 1000 nm and more preferably has an average light transmittance of 1% or less in the wavelength range.

The infrared transmitting film 4 can be made from ink, paste or the like containing a pigment mixture in which, for example, red and blue pigments are mixed or red, blue, and yellow pigments are mixed. Specific example of the pigment that can be used are pigments cited in Patent Literature 1. No particular limitation is placed on the binder for the ink, paste or the like and, for example, an ultraviolet curable resin or a resin for a resist material can be used. Specific examples of the binder that can be used are binders cited in Patent Literature 1.

The infrared transmitting film 4 can be formed by, for example, photolithography or screen printing. The process is not limited to the above and the infrared transmitting film 4 may be formed by other processes. The infrared transmitting film is preferably formed of a film having an average light transmittance of 3% or less in a wavelength range of 400 nm to 750 nm and more preferably formed of a film having an average light transmittance of 1% or less in the wavelength range. The infrared transmitting film 4 is particularly preferably formed of a film having the same light transmittance in a wavelength range of 400 nm to 750 nm as the visible/infrared opaque film 3. Furthermore, the infrared transmitting film 4 is preferably formed of a film having an average light transmittance of 15% or more in a wavelength range of 850 nm to 1000 nm, more preferably formed of a film having an average light transmittance of 50% or more in the wavelength range, and particularly preferably formed of a film having an average light transmittance of 75% to 90% in the wavelength range.

The average light transmittance of each of the visible/infrared opaque film 3 and the infrared transmitting film 4 is a value measured from a 1.0 µm thick film formed on a 1 mm thick, colorless soda-lime glass.

The anti-glare layer 20 is provided on the first principal surface 2a of the glass plate 2. As described previously, the anti-glare layer 20 is provided for the purpose of giving the light shielding plate 1 an anti-glare effect. The 60° specular gloss of the surface of the anti-glare layer 20 is preferably 140 or less, more preferably 130 or less, and still more preferably in a range of 80 to 120. Within the above ranges, the anti-glare effect can be further improved.

The arithmetic mean roughness Ra of the surface of the anti-glare layer 20 is preferably 0.01 µm or more, more preferably in a range of 0.02 to 0.2 µm, and still more preferably in a range of 0.04 to 0.1 µm. Within the above ranges, the anti-glare effect can be further improved.

The anti-glare layer 20 preferably has concaves and convexes made of an inorganic substance. Such an anti-glare layer 20 can be made from an inorganic paint. Examples of the binder for the inorganic paint that can be used include silica precursors, alumina precursors, zirconia precursors, and titania precursors. Among them, silica precursors are particularly preferably used. The inorganic paint may contain inorganic particles.

Examples of the silica precursors include alkoxysilane, such as tetraethoxysilane or tetramethoxysilane, hydrolytic condensation products of alkoxysilane (sol-gel silicas), and silazane. From the viewpoint of further improving the anti-glare effect, at least one of alkoxysilane, such as tetraethoxysilane or tetramethoxysilane, and hydrolytic condensation products thereof is preferred and hydrolytic condensation products of tetraethoxysilane are more preferred.

Examples of the alumina precursors include aluminum alkoxide, hydrolytic condensation products of aluminum alkoxide, water-soluble aluminum salts, and aluminum chelates.

Examples of the zirconia precursors include zirconium alkoxide and hydrolytic condensation products of zirconium alkoxide.

Examples of the titania precursors include titanium alkoxide and hydrolytic condensation products of titanium alkoxide.

Examples of the inorganic particles include silica particles, alumina particles, zirconia particles, and titania particles. Among them, silica particles are particularly preferably used. The content of the inorganic particles is, of the total amount of the solid (100% by mass, in which the content of the precursor is calculated in terms of its oxide) in the paint, preferably 0.5 to 10% by mass and more preferably 1 to 5% by mass.

The anti-glare layer 20 can be formed by applying the paint on the glass plate 2. For example, the paint can be applied on the glass plate 2 by spraying using a spray nozzle. The anti-glare layer 20 is formed by, after the application of the paint, drying and firing the paint. The firing temperature is, for example, preferably 100 to 250° C.

The average thickness of the anti-glare layer 20 is preferably in a range of 0.01 to 3 µm, more preferably in a range of 0.02 to 2 µm, and still more preferably in a range of 0.03 to 1 µm.

The light-absorptive antireflection film 10 serving as a light absorption film is provided on top of the anti-glare layer 20. The light-absorptive antireflection film 10 is provided across the visible/infrared opaque region B, the infrared transmitting regions C, and the visible transmitting region A. By the provision of the light-absorptive antireflection film 10, the infrared transmitting regions C can be made less distinguishable from the visible/infrared opaque region B with the naked eye. In the present invention, the light-absorptive antireflection film 10 is preferably formed of a film having a transmittance of 50±20% at a wavelength of 550 nm, more preferably formed of a film having a transmittance of 50±15% at the wavelength, and still more preferably formed of a film having a transmittance of 50±10% at the wavelength. Within the above ranges, the infrared transmitting regions C can be made still less distinguishable from the visible/infrared opaque region B with the naked eye. Furthermore, by providing the light-absorptive antireflection film 10 even in the visible transmitting region A as in this embodiment, the contrast of video images can be increased. In this embodiment, the transmittance of the visible transmitting region A at a wavelength of 550 nm is 46%.

The region provided with the light-absorptive antireflection film 10 preferably has a reflectance of 1% or less at a wavelength of 550 nm, more preferably has a reflectance of 0.95% or less at the wavelength, and particularly preferably has a reflectance of 0.9% or less at the wavelength. Within the above ranges, the infrared transmitting regions C can be made still less distinguishable from the visible/infrared opaque region B with the naked eye. In this embodiment, the region provided with the light-absorptive antireflection film 10 has a reflectance of 0.8% at a wavelength of 550 nm. The lower limit of the reflectance at a wavelength of 550 nm is generally 0.1%.

In the visible transmitting region A, the average transmittance of light in a wavelength range of 400 nm to 750 nm is preferably in a range of 25 to 70% and more preferably in a range of 35 to 65%. Furthermore, in the visible transmitting region A, the average reflectance of light in a wavelength range of 400 nm to 750 nm is preferably 1% or less and more preferably 0.8% or less. Within the above ranges, the contrast of video images can be increased and reflected light can be reduced, which enables clearly displaying of the video images.

The light-absorptive antireflection film 10 can be formed of, for example, a dielectric multilayer film. An example of such a dielectric multilayer film is a film stack including a silicon nitride layer, a layer of a nitride or an oxynitride of at least one metal selected from the group consisting of niobium, titanium, zirconium, yttrium, tungsten, aluminum, and hafnium, and a silicon oxide layer as the outermost layer. The dielectric multilayer film preferably includes a layer of a niobium nitride and a layer of a titanium nitride as the layers of nitrides. Furthermore, the silicon nitride layers and the layers of nitride are preferably alternately laid on top of one another. The silicon nitride layers and the layers of oxynitride are preferably alternately laid on top of one another.

The thickness of each layer forming the light-absorptive antireflection film 10 is preferably in a range of 5 to 200 nm, more preferably in a range of 8 to 150 nm, and still more preferably 12 to 110 nm. Furthermore, the total number of layers forming the light-absorptive antireflection film 10 is preferably in a range of 2 to 8. By employing the above ranges, an effective and easily formable film can be obtained. The thickness of each layer forming the light-absorptive antireflection film 10 is appropriately selected in consideration of set values of the transmittance and reflectance at a wavelength of 550 nm.

The light-absorptive antireflection film 10 can be formed by, for example, sputtering, CVD or vacuum vapor deposition. The total thickness of the light-absorptive antireflection film 10 is preferably in a range of 0.05 to 3 μm and more preferably in a range of 0.1 to 1 μm.

FIG. 3 is a cross-sectional view showing the light-absorptive antireflection film in this embodiment. As shown in FIG. 3, the light-absorptive antireflection film 10 in this embodiment is formed by stacking, on the anti-glare layer 20, a silicon nitride layer 11 (with a thickness of 48 nm), a titanium nitride layer 12 (with a thickness of 20 nm), a silicon nitride layer 13 (with a thickness of 20 nm), a niobium nitride layer 14 (with a thickness of 24 nm), a silicon nitride 15 (with a thickness of 10 nm), and a silicon oxide layer 16 (with a thickness of 95 nm) in this order. Therefore, the light-absorptive antireflection film 10 in this embodiment is constituted by six layers.

The light-absorptive antireflection film 10 in this embodiment is formed, using a sputtering deposition system, by forming the nitride layers in a nitrogen atmosphere and forming the oxide layer in an oxygen atmosphere.

The antifouling layer 30 is provided on top of the light-absorptive antireflection film 10. The antifouling layer 30 preferably contains an organic silicon compound. When the antifouling layer 30 contains an organic silicon compound, the adhesion thereof to the light-absorptive antireflection film 10 can be increased. Thus, even after a long period of use, the antifouling layer 30 becomes less likely to be peeled off and becomes less likely to decrease its slipperiness.

Examples of the organic silicon compound are one or more compounds selected from silane coupling agents, silicone oils, silicone resins, silicone rubbers, hydrophobic silicas, and fluorine-containing organic silicon compounds. Preferred among them are fluorine-containing organic silicon compounds.

Examples of the fluorine-containing organic silicon compounds are polymers having a —Si—O—Si— unit in their main chain and a fluorine-containing, water-repellent functional group in their side chain. The fluorine-containing organic silicon compound can be synthesized, for example, by dehydrocondensation of silanol. Examples of the fluorine-containing organic silicon compound include KY-130 (manufactured by Shin-Etsu Chemical Co., Ltd.), OPTOOL DSX (manufactured by Daikin Industries, Ltd.), TSL8257, TSL8233, and TSL831 (all manufactured by Momentive Performance Materials Japan LLC), KBM-7803 (manufactured by Shin-Etsu Chemical Co., Ltd.), AY43-158E (manufactured by Dow Corning Toray Co., Ltd.), and KP-801M (manufactured by Shin-Etsu Chemical Co., Ltd.).

The thickness of the antifouling layer 30 is preferably in a range of 0.001 to 0.05 μm, more preferably in a range of 0.002 to 0.03 μm, and still more preferably in a range of 0.003 to 0.01 μm.

No particular limitation is placed on the method for forming the antifouling layer 30 and, for example, the antifouling layer 30 can be formed by applying a diluted solution of a fluorine-containing organic silicon compound with a spray or other means.

FIG. 4 is a photograph showing the casing part (the visible/infrared opaque region B and the infrared transmitting region C) of the light shielding plate 1 according to this embodiment. FIG. 5 is a photograph showing a casing part (a visible/infrared opaque region B and an infrared transmitting region C) of a comparative light shielding plate. In the comparative light shielding plate, an antifouling layer 30 is formed on top of an anti-glare layer 20 without the formation of a light-absorptive antireflection film 10 between them.

FIG. 5 shows a light shielding plate in which the light-absorptive antireflection film 10 is removed from the light shielding plate shown in FIG. 1. As seen from FIG. 5, in the comparative light shielding plate, the infrared transmitting region C of the casing part is brighter than the visible/infrared opaque region B thereof and is therefore distinguishable from the visible/infrared opaque region B with the naked eye. In reality, the infrared transmitting region C is distinguished with a tinge of red. In contrast, as seen from FIG. 4, in the light shielding plate 1 according to this embodiment, the infrared transmitting regions C of the casing part is less distinguishable from the visible/infrared opaque region B thereof with the naked eye.

As seen from the above, by the provision of the light-absorptive antireflection film 10 across the visible/infrared opaque region B and the infrared transmitting regions C according to the present invention, the infrared transmitting regions C can be made less distinguishable from the visible/infrared opaque region B.

Although in the above embodiment the light-absorptive antireflection film 10 is provided all over the visible transmitting region A, the visible/infrared opaque region B, and the infrared transmitting regions C, the present invention is not limited to this and the light-absorptive antireflection film 10 may be provided at least over the visible/infrared opaque region B and the infrared transmitting regions C.

A further description will be given below of the structures of various embodiments of the visible/infrared opaque region and the infrared transmitting region in the present invention.

FIG. 6 is a cross-sectional view showing a visible/infrared opaque region and an infrared transmitting region in a first embodiment of the present invention. The structure of the visible/infrared opaque region and the infrared transmitting region in this embodiment is substantially the same structure as in the embodiment shown in FIGS. 1 and 2. Only the light-absorptive antireflection film 10 is provided on the first principal surface 2a. In this embodiment, the infrared transmitting film 4 is provided, on the second principal surface 2b, in the infrared transmitting region and at least a portion of the visible/infrared opaque region next to the infrared transmitting region and is provided in the visible/infrared opaque region to overlie the visible/infrared opaque film 3. By employing this structure, the infrared transmitting film can be formed in the infrared transmitting region without any space and the boundary between the visible/infrared opaque region and the infrared transmitting region can be made even less distinguishable with the naked eye.

FIG. 7 is a cross-sectional view showing a visible/infrared opaque region and an infrared transmitting region in a second embodiment of the present invention. In this embodiment, the infrared transmitting film 4 is provided on the second principal surface 2b and the visible/infrared opaque film 3 is then provided in the visible/infrared opaque region on the infrared transmitting film 4. Therefore, the infrared transmitting film 4 is provided, on the second principal surface 2b, in the infrared transmitting region and the visible/infrared opaque region and is provided, in the visible/infrared opaque region, between the glass plate 2 and the visible/infrared opaque film 3.

Also in this embodiment, the infrared transmitting film can be formed in the infrared transmitting region without any space and the boundary between the visible/infrared opaque region and the infrared transmitting region can be made even less distinguishable with the naked eye.

FIG. 8 is a cross-sectional view showing a visible/infrared opaque region and an infrared transmitting region in a third embodiment of the present invention. In this embodiment, the light-absorptive antireflection film 10 is provided on the second principal surface 2b and the infrared transmitting film 4 is then provided on the light-absorptive antireflection film 10. Furthermore, the visible/infrared opaque film 3 is provided in the visible/infrared opaque region on the infrared transmitting film 4. Therefore, the light-absorptive antireflection film 10 is provided on the second principal surface 2b and the infrared transmitting film 4 is provided, over the second principal surface 2b, in the infrared transmitting region and the visible/infrared opaque region and provided, in the visible/infrared opaque region, between the light-absorptive antireflection film 10 and the visible/infrared opaque film 3.

Also in this embodiment, the infrared transmitting film can be formed in the infrared transmitting region without any space and the reflectance of visible light becomes constant over the visible/infrared opaque region and the infrared transmitting region, so that the boundary between the visible/infrared opaque region and the infrared transmitting region can be made even less distinguishable with the naked eye.

FIG. 9 is a cross-sectional view showing a visible/infrared opaque region and an infrared transmitting region in a fourth embodiment of the present invention. In this embodiment, the light-absorptive antireflection film 10 is provided on the second principal surface 2b, and the visible/infrared opaque film 3 and the infrared transmitting film 4 which have the same structure as in the first embodiment are then formed on the light-absorptive antireflection film 10.

Also in this embodiment, the infrared transmitting film can be formed in the infrared transmitting region without any space and the boundary between the visible/infrared opaque region and the infrared transmitting region can be made even less distinguishable with the naked eye.

The plate according to the present invention can be used as, besides a cover glass for a display, for example, exteriors of a building, a car, and an electrical appliance.

REFERENCE SIGNS LIST

1 . . . light shielding plate
2 . . . glass plate
2a . . . first principal surface
2b . . . second principal surface
3 . . . visible/infrared opaque film
3a . . . recess
4 . . . infrared transmitting film
10 . . . light-absorptive antireflection film
11 . . . silicon nitride layer
12 . . . titanium nitride layer
13 . . . silicon nitride layer
14 . . . niobium nitride layer
15 . . . silicon nitride layer
16 . . . silicon oxide layer
20 . . . anti-glare layer
30 . . . antifouling layer
A . . . visible transmitting region
B . . . visible/infrared opaque region
C . . . infrared transmitting region

The invention claimed is:

1. A light shielding plate comprising:
a glass plate having a first principal surface and a second principal surface opposed to the first principal surface;
a visible/infrared opaque film provided on or over a portion of the second principal surface to provide a visible/infrared opaque region that shields visible light and infrared light;
an infrared transmitting film provided on or over a portion of the second principal surface to provide an infrared transmitting region that transmits infrared light; and
a light absorption film provided on or over the first principal surface or the second principal surface, wherein
the infrared transmitting region is located next to the visible/infrared opaque region,
the light absorption film is provided in the visible/infrared opaque region and the infrared transmitting region,
the infrared transmitting film is provided at least in the infrared transmitting region, and
the infrared transmitting film is provided in the infrared transmitting region and at least a portion of the visible/infrared opaque region, next to the infrared transmitting region, overlying the visible/infrared opaque film.

2. The light shielding plate according to claim 1, wherein the visible/infrared opaque region and the infrared transmitting region are black as viewed from a side of the first principal surface.

3. The light shielding plate according to claim 1, further comprising a visible transmitting region that transmits visible light, wherein the light absorption film is also provided in the visible transmitting region.

4. The light shielding plate according to claim 1, wherein the light absorption film is provided on or over the first principal surface and has an antireflection function.

5. The light shielding plate according to claim 1, wherein a region of the light shielding plate provided with the light absorption film has a reflectance of 1% or less at a wavelength of 550 nm.

6. The light shielding plate according to claim 1, wherein the light absorption film includes:
a silicon nitride layer; and
a layer of a nitride or an oxynitride of at least one metal selected from the group consisting of niobium, titanium, zirconium, yttrium, tungsten, aluminum, and hafnium.

7. The light shielding plate according to claim 6, wherein the light absorption film includes a layer of a niobium nitride and a layer of a titanium nitride as the layers of nitrides.

8. The light shielding plate according to claim 6, wherein the silicon nitride layers and the layers of nitride are alternately laid on top of one another in the light absorption film.

9. The light shielding plate according to claim 1, wherein the light absorption film is provided over the first principal surface, and
an anti-glare layer is provided between the glass plate and the light absorption film.

10. The light shielding plate according to claim 1, wherein the light absorption film is provided on or over the first principal surface, and
an antifouling layer is then provided on top of the light absorption film.

11. A light shielding plate comprising:
a glass plate having a first principal surface and a second principal surface opposed to the first principal surface;
a visible/infrared opaque film provided on or over a portion of the second principal surface to provide a visible/infrared opaque region that shields visible light and infrared light;
an infrared transmitting film provided on or over a portion of the second principal surface to provide an infrared transmitting region that transmits infrared light; and
a light absorption film provided on or over the first principal surface or the second principal surface, wherein
the infrared transmitting region is located next to the visible/infrared opaque region,
the light absorption film is provided in the visible/infrared opaque region and the infrared transmitting region,
the infrared transmitting film is provided at least in the infrared transmitting region, and
the infrared transmitting film is provided in the infrared transmitting region and at least a portion of the visible/infrared opaque region, next to the infrared transmitting region, underlying the visible/infrared opaque film.

12. A light shielding plate comprising:
a glass plate having a first principal surface and a second principal surface opposed to the first principal surface;
a visible/infrared opaque film provided on or over a portion of the second principal surface to provide a visible/infrared opaque region that shields visible light and infrared light;
an infrared transmitting film provided on or over a portion of the second principal surface to provide an infrared transmitting region that transmits infrared light; and
a light absorption film provided on or over the first principal surface or the second principal surface, wherein
the infrared transmitting region is located next to the visible/infrared opaque region,
the light absorption film is provided in the visible/infrared opaque region and the infrared transmitting region,
the infrared transmitting film is provided at least in the infrared transmitting region,
the light absorption film is provided on the second principal surface, and
the infrared transmitting film is provided in the infrared transmitting region and at least a portion of the visible/infrared opaque region, next to the infrared transmitting region, between the light absorption film and the visible/infrared opaque film.

* * * * *